Figure 1:
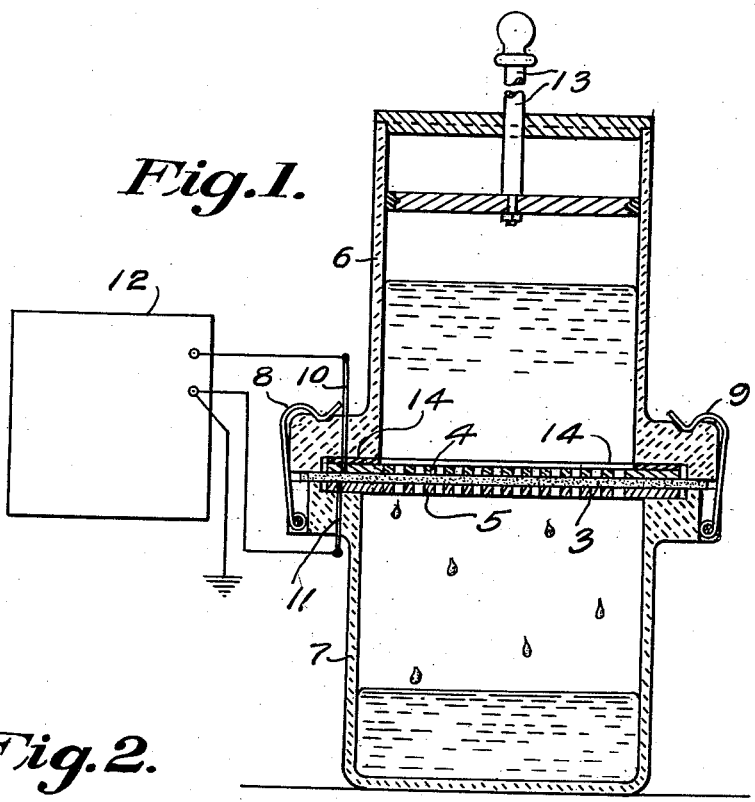

Oct. 23, 1956    E. C. SCHURCH    2,767,574
APPARATUS FOR INDICATING MOISTURE IN OIL
Filed June 22, 1953

INVENTOR
EDWARD C. SCHURCH
BY
H. L. ⎯⎯⎯
ATTORNEY

United States Patent Office 2,767,574
Patented Oct. 23, 1956

2,767,574

APPARATUS FOR INDICATING MOISTURE IN OIL

Edward C. Schurch, Denver, Colo.

Application June 22, 1953, Serial No. 363,423

1 Claim. (Cl. 73—73)

(Granted under Title 35, U. S. Code (1952), sec. 266)

The invention described herein may be manufactured and used by or for the Government of the United States for governmental purposes without the payment to me of any royalty thereon in accordance with the provisions of U. S. Code, Title 35, Section 266.

This invention relates to an improved apparatus for measuring the relative dielectric loss and resistivity of electrical insulating oil so as to determine its suitability for use in electrical devices such as transformers and oil circuit breakers.

Moisture is the principal objectionable contaminant of insulating oil which causes a high dielectric loss and low insulating resistance with a resulting failure of the apparatus in which it is used. Testing cells have been used in the prior art for quantitatively detecting moisture in insulating oil. These cells generally comprised two, closely spaced, parallel electrodes which were immersed in the oil under test so that resistivity, dielectric loss, and other measurements of the liquid volume between the two electrodes could be taken. The result obtained by this apparatus and method were quite often inaccurate and erratic because the extremely high impedance of the liquid between the electrodes was easily affected by extraneous and transient conditions which would cause partial shorting.

Accordingly, a principal object of this invention is to make accurate and stable measurements of the dielectric loss and the electrical resistance of insulating oil. This object is attained to a large extent by making the necessary electrical measurements at a relatively lower impedance level than that of the prior art devices.

A preferred mode of operation of the novel testing apparatus of this invention contemplates the passing of an oil sample through filter means which absorb substantially all of the free and emulsified water but not the oil, and then testing the filter means, such as for example, paper, for resistivity and dielectric measurements which are indicative of the moisture content of the oil under test.

By this process, the ratio of water to oil in the samples is effectively multiplied many hundreds of times, thus giving a very sensitive indication of water content. That is, the entire sample of oil is passed through the filter paper and all the water is absorbed by the paper, and the test is then made on the liquid which the paper had absorbed. By this operation the water content of many more volumes of oil than that which could have been tested by the prior art electrode method is utilized herein for a single test at relatively lower impedance levels. If the oil is substantially pure, a low dielectric loss or high resistance rating will be obtained when the filter paper is sandwiched by a pair of plates. If, however, there is a substantial quantity of water in the oil, the paper will absorb this water from the oil passing therethrough until saturated, and the dielectric loss will be high and the resistance low.

Figure 2:
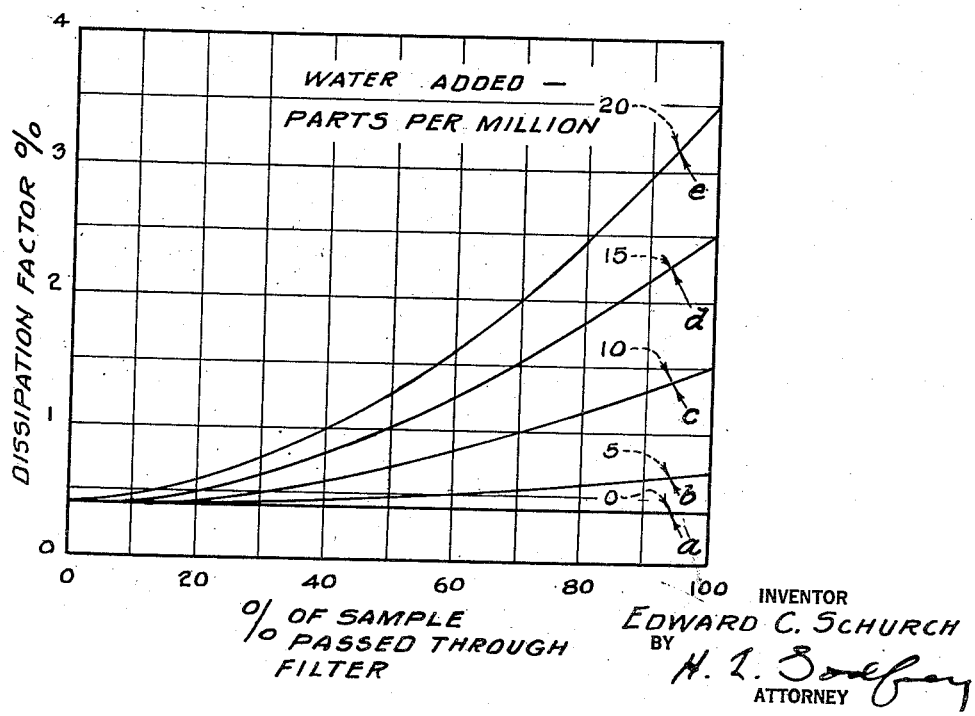

In order that all of the features of this invention and the mode of operation thereof may be readily understood, a detailed description follows hereinafter, with reference being made to the drawings wherein:

Fig. 1 is a sectional view of a preferred embodiment of the novel apparatus of this invention; and Fig. 2 is a graph showing the test results for various oil samples having different water contents.

In the test cell of Fig. 1, a circular disc of laboratory filter paper 3, which has been previously heated to drive off any residual moisture it might contain, is clamped between two circular metal plates 4 and 5, which serve as electrodes for testing the electrical conductivity of the sandwiched filter paper 3, and also as capacitor plates for the capacitor formed by plates 4 and 5 with filter paper 3 acting as the dielectric. Plates 4 and 5 are perforated to permit the oil sample in upper container 6 to pass through plate 4, filter paper 3, and plate 5 into lower container 7. Both upper container 6 and lower container 7 are constructed of low-loss insulating material so as not to seriously short plates 4 and 5 to one another through spring means 8 and 9 which are used to clamp the assembly together. Gasket 14 prevents the oil sample in the upper container 6 from leaking out.

Electrical contact is made to plate 4 through terminal 10 and electrical contact is made to plate 5 through terminal 11 whereby external connections can be made to testing meter 12 which may be, for example, a capacitance bridge or a ohmmeter.

The oil test cell is used by pouring a sample of oil within upper container 6 and letting the sample trickle through filter paper 3. A plunger 13 is provided to force the oil through the filter paper in order to reduce the time required for completing the test. As the sample trickles through the filter paper, the moisture is captured and held, and clean, dry oil is collected within lower container 7. If the oil is dry, the dissipation factor reading by meter 12 will remain at a practically constant value as the sample passes through the filter, as is shown by curve $a$ in Fig. 2. If any moisture is present, the dissipation factor will rise as the sample passes through, the amount of change depending upon the moisture content of the oil as is shown in curves $b$, $c$, $d$, and $e$ of Fig. 2.

Carbon, sludge, or other solids in the oil have very little effect on the readings since they collect on the top surface of the filter paper and are not absorbed so as to cause any change in the electrical constants of the paper.

The test cell can be used for both power factor (dissipation) and resistivity measurements. However, power factor or dissipation factor measurements are more consistent since they are not appreciably affected by varying thickness in the filter paper or changes in clamping spring pressure.

The absorption of the water in the oil sample by the filter paper simulates the actual condition in a transformer wherein water carried by the oil is absorbed by the organic insulating materials for the windings. Preliminary tests indicate that the filter paper will absorb water whether free, in emulsion, or in solution to about the same extent that insulation in the transformer would, and therefore the test cell gives a moisture test directly related to the actual condition in the transformer, which in the usual instance is different from that in the oil pool.

While the test cell and method herein described are particularly adapted for testing samples of insulating oils taken from tanks, barrels, transformers or oil circuit breakers, it should be understood that the principles thereof are also applicable to continuous monitoring of an oil supply by pumping oil continuously through a test cell to which is connected an indicating instrument to show the condition of the oil.

What is claimed is:

Apparatus for utilizing the entire moisture content of a sample of oil in testing for moisture, which comprises a container for the oil sample, a unit extending transversely across the container dividing the container into compartments communicating with each other only through the unit, the unit being formed of electrically conductive metal plates constituting electrodes electrically insulated from each other by a sheet of substantially moisture-free filter paper sandwiched therebetween, the plates having perforations extending therethrough permitting passage of the entire sample of oil through the unit from one compartment to the other whereby the filter paper absorbs and retains substantially the entire moisture content of the oil while permitting flow of the oil therethrough, an electric circuit connected to the plates completed through the filter paper sensitive to variations in the moisture content of the paper due to the moisture absorbed from the sample, and an indicator in said circuit for giving an indication of these changes in electrical characteristics.

References Cited in the file of this patent

UNITED STATES PATENTS

| | | |
|---|---|---|
| 1,328,044 | Hills | Jan. 13, 1920 |
| 1,708,073 | Allen | Apr. 9, 1929 |
| 2,266,350 | Womack | Dec. 16, 1941 |
| 2,535,026 | Anderson | Dec. 26, 1950 |
| 2,679,027 | Clark | May 18, 1954 |
| 2,682,168 | McDonald | June 29, 1954 |
| 2,734,377 | Traver | Feb. 14, 1956 |

FOREIGN PATENTS

| | | |
|---|---|---|
| 435,171 | Germany | Oct. 9, 1926 |